(12) United States Patent
Jenart et al.

(10) Patent No.: US 10,974,740 B2
(45) Date of Patent: Apr. 13, 2021

(54) RAILCAR ADAPTER FOR CONNECTING A RAILCAR BODY TO A BEARING

(71) Applicant: Aktiebolaget SKF, Gothenburg (SE)

(72) Inventors: Gautier Jenart, Saint Herblain (FR); Ludovic Fenayon, Montbazon (FR); Thierry Le Moigne, Luynes (FR)

(73) Assignee: Aktiebolaget SKF, Gothenburg (SE)

( * ) Notice: Subject to any disclaimer, the term of this patent is extended or adjusted under 35 U.S.C. 154(b) by 323 days.

(21) Appl. No.: 15/994,125

(22) Filed: May 31, 2018

(65) Prior Publication Data

US 2019/0367056 A1    Dec. 5, 2019

(51) Int. Cl.
*B61F 5/26*   (2006.01)
*B61F 15/06*  (2006.01)
*B61F 15/12*  (2006.01)
*B61F 15/22*  (2006.01)
*B61F 5/32*   (2006.01)
*B61F 15/20*  (2006.01)

(52) U.S. Cl.
CPC ............ *B61F 5/26* (2013.01); *B61F 5/32* (2013.01); *B61F 15/06* (2013.01); *B61F 15/12* (2013.01); *B61F 15/20* (2013.01); *B61F 15/22* (2013.01); *F16C 2326/10* (2013.01)

(58) Field of Classification Search
CPC .. B61F 5/26; B61F 15/02; B61F 15/06; B61F 15/12; B61F 15/20; B61F 15/22; B61F 5/32
See application file for complete search history.

(56) References Cited

U.S. PATENT DOCUMENTS

| | | | |
|---|---|---|---|
| 3,272,573 A | 9/1966 | Payson et al. | |
| 4,687,211 A | 8/1987 | Bessone | |
| 5,237,933 A | 8/1993 | Bucksbee | |
| 5,794,538 A | 8/1998 | Pitchford | |
| 5,799,582 A | 9/1998 | Rudibaugh et al. | |
| 7,143,700 B2 * | 12/2006 | Forbes ............... | B61F 5/14 105/223 |
| 7,527,131 B1 | 5/2009 | Wike | |
| 7,775,163 B2 | 8/2010 | Forbes et al. | |
| 7,966,946 B1 | 6/2011 | Novak et al. | |
| 8,272,333 B2 * | 9/2012 | Forbes ............... | B61F 15/08 105/223 |
| 8,893,626 B2 | 11/2014 | Berg et al. | |
| 9,434,393 B2 * | 9/2016 | Gotlund ............. | B61F 5/125 |
| 10,384,695 B2 * | 8/2019 | Fenayon ............ | B61F 15/20 |
| 10,399,578 B2 * | 9/2019 | Fenayon ............ | B61F 15/06 |
| 10,576,999 B2 * | 3/2020 | Fenayon ............ | B61F 15/12 |
| 10,727,718 B2 * | 7/2020 | McGoogan ........ | H02K 7/04 |
| 2014/0318412 A1 | 10/2014 | East et al. | |
| 2015/0183442 A1 | 7/2015 | Gotlund et al. | |
| 2017/0129510 A1 | 5/2017 | Golembiewski et al. | |

(Continued)

FOREIGN PATENT DOCUMENTS

EP    3168106 A1    5/2017
WO   2016099876 A1  6/2016

*Primary Examiner* — Zachary L Kuhfuss
(74) *Attorney, Agent, or Firm* — Garcia-Zamor Intellectual Property Law; Ruy Garcia-Zamor; Bryan Peckjian

(57) ABSTRACT

A railcar adapter for radially connecting a railcar body to a bearing. The railcar adapter includes an adapter body, and a top cover mounted onto an outer surface of the adapter body. The top cover is provided with at least one curved outer surface to be in direct radial contact with the railcar body.

16 Claims, 3 Drawing Sheets

(56) References Cited

U.S. PATENT DOCUMENTS

| | | | | |
|---|---|---|---|---|
| 2017/0137040 A1* | 5/2017 | Fenayon | ................ | B61F 15/06 |
| 2017/0137041 A1* | 5/2017 | Fenayon | ................ | B61F 15/12 |
| 2017/0137042 A1* | 5/2017 | Fenayon | ................ | B61F 15/20 |
| 2019/0367052 A1* | 12/2019 | Jenart | ................ | B61F 15/12 |
| 2019/0367053 A1* | 12/2019 | Jenart | ................ | B61F 15/22 |
| 2019/0367054 A1* | 12/2019 | Jenart | ................ | B61F 15/12 |
| 2019/0367055 A1* | 12/2019 | Jenart | ................ | B61F 15/12 |
| 2019/0367056 A1* | 12/2019 | Jenart | ................ | B61F 15/06 |
| 2020/0198667 A1* | 6/2020 | Zeitler | ................ | B61F 15/26 |

* cited by examiner

RAILCAR ADAPTER FOR CONNECTING A RAILCAR BODY TO A BEARING

TECHNOLOGICAL FIELD

The present invention relates to the field of bearing adapters for a railcar.

BACKGROUND

A railcar generally comprises a bogie frame provided with a pair of side frames on each side having downwardly opening jaws. A bearing adapter is vertically moveable within the jaws and rests on a bearing mounted on a railcar axle carrying a wheel of the railcar. The bearing adapter is thus a rigid connection between the bogie frame of the railcar and the bearing. Typically, a bearing for a railcar axle fits around a journal at the end of the railcar axle where it is mounted between a backing ring assembly and an end cap.

However, the railcar adapter may move with respect to the bearing. The load applied by the bogie frame through the adapter may not be well distributed on the bearing, notably on the rolling elements when the bearing is of the rolling bearing type. This results in wear on the inner surface and the outer surface of the railcar adapter, as well as in failure of the bearing.

Moreover, the railcar adapter may come into contact with the backing ring or the end cap of bearing. This results in unexpected wear of these parts and then reduce their service life.

The railcar displacement with respect to the bearing can also lead to a direct contact between the adapter and one of the bearing seals. In that case, bearing is not suitably sealed. Then pollution with contaminant particles, dust, and water may enter the bearing from the exterior, and potentially damage the bearing parts.

Typically, bearings are filled with lubricant, in particular grease, to lubricate the rolling contact surfaces that support in rotation the railcar axle. The aim is to reduce friction and heat exchange, so as to reduce wear of the parts and risks of break. However, bearing seals affected by a railcar adapter displacement may lead to lubricant leakage to the outside of bearing, and then in failure to the bearing.

These and other problems are addressed by embodiments of the present invention.

SUMMARY

To this end, the invention relates to a railcar adapter for radially connecting a railcar body to a bearing. The railcar adapter comprises an adapter body having two lateral channels each delimited by a pair of opposed lugs and a lateral surface perpendicular to the opposed lugs. Lateral channels are adapted to cooperate with the railcar body. The adapter body further comprises two frontal surfaces, an inner surface acting as a bearing seat for the bearing, and an outer surface. The railcar adapter also comprises two frontal flanges that inwardly protrude with respect to the inner surface, and that delimit with the inner surface a housing for the bearing. The railcar adapter is further provided with a top cover mounted onto the outer surface of adapter body, the top cover having at least one outer surface adapted to be in direct radial contact with the railcar body. The outer surface of top cover, in cross-section through the axis of rotation of bearing, is curved.

The adapter body of railcar adapter may be standardized, the top cover being adaptable depending on the application characteristics.

Such arrangement improves the service life of the railcar adapter and the bearing by reducing wear. The curved outer surface of top cover compensates the relative misalignment between the railcar body and the bearing. The load applied by the bogie frame through the adapter is uniformly distributed on the bearing, notably on the rolling elements when the bearing is of the rolling bearing type.

According to further aspects of the invention which are advantageous but not compulsory, such a railcar adapter may incorporate one or several of the following features:

The top cover is securely fixed to the outer surface of adapter body by fixing means.

The fixing means are screws.

The top cover is provided with at least one recess receiving a radially outwardly projecting pin provided to the outer surface of adapter body.

The top cover comprises an outer side having an upper central groove extending along an axis parallel to the axis of rotation of the bearing, the top cover having two curved outer surfaces on both sides of the upper central groove and adapted to be in direct radial contact with the railcar body.

The at least one recess is provided within the upper central groove.

The outer surface of top cover is spherical.

The outer surface of top cover is cylindrical.

The outer surface of adapter body is flat.

The adapter body is made from metal, for example, by casting. For example, the adapter body is made from cast steel or cast iron.

The top cover is made from metal.

The top cover is made from plastic or polymeric material.

According to another aspect, the invention relates to a railcar adapter assembly comprising a railcar adapter according to any of the preceding embodiments, a bearing mounted inside the railcar adapter, a backing ring adapted to come into axial contact with the bearing at a first side, and an end cap assembly adapted to come into axial contact with the bearing at another side, opposite to the first side.

In one embodiment, the bearing comprises at least one inner ring and at least one outer ring mounted in radial contact with the inner surface of the railcar adapter.

In one embodiment, the bearing comprises at least one row of rolling elements, arranged between raceways provided on the inner and outer rings.

In one embodiment, the inner ring of the bearing is made in two parts, axially separated by an axial spacer.

According to another aspect, the invention relates to railcar axle comprising a railcar adapter assembly according to any of the preceding embodiments, a shaft being rotatably mounted about an axis of rotation relative to a railcar adapter, inside the bearing. The shaft comprises a first end mounted radially inside the backing ring and a second end, opposite to the first end, secured to the end cap assembly.

BRIEF DESCRIPTION OF THE DRAWINGS

Other advantages and features of the invention will emerge upon examining the detailed description of embodiments, which are in no way limiting, and the appended drawings wherein.

DETAILED DESCRIPTION

Figure 1:
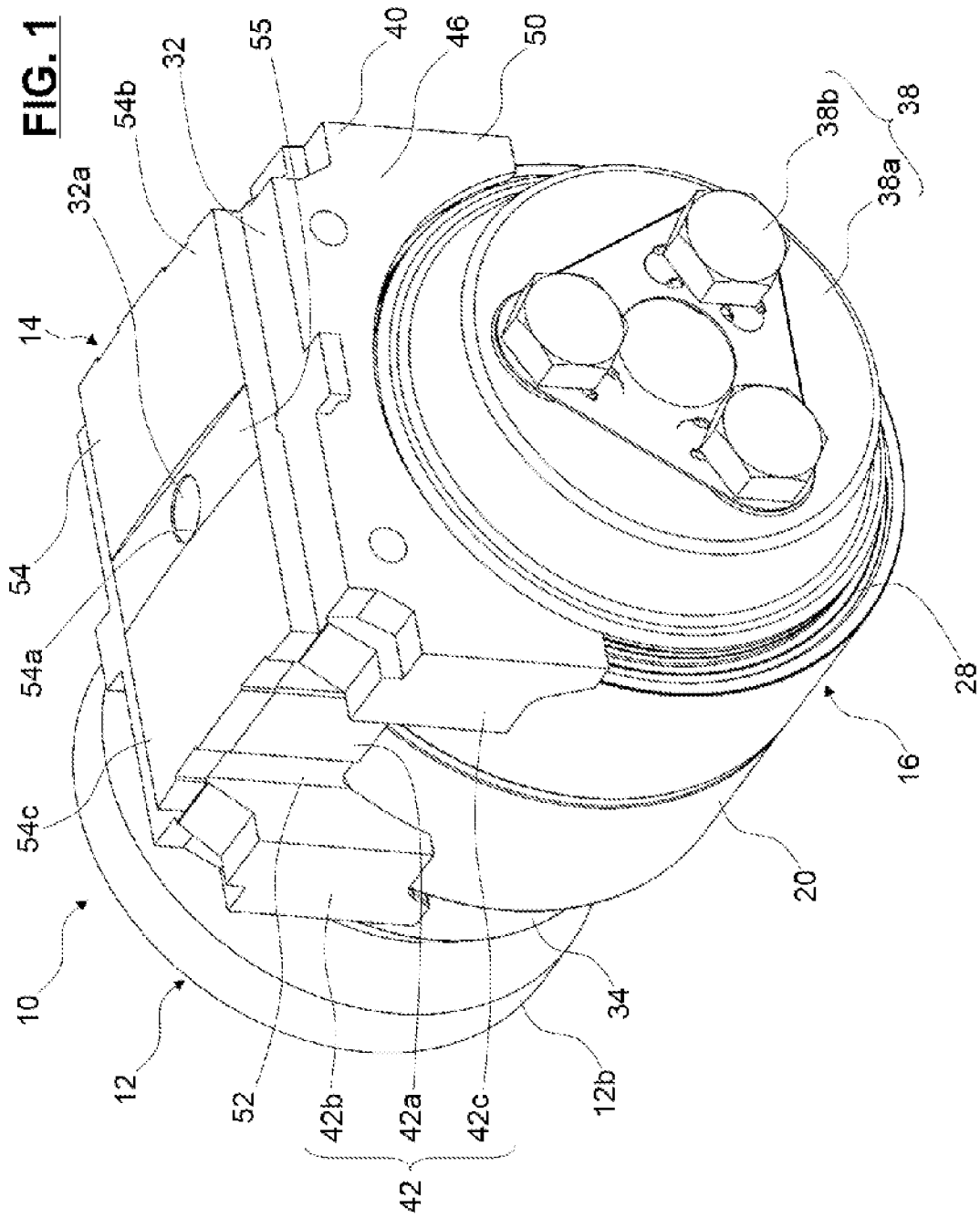
FIG. 1 is a perspective view of a railcar axle provided with a railcar adapter according to the invention.
Figure 2:
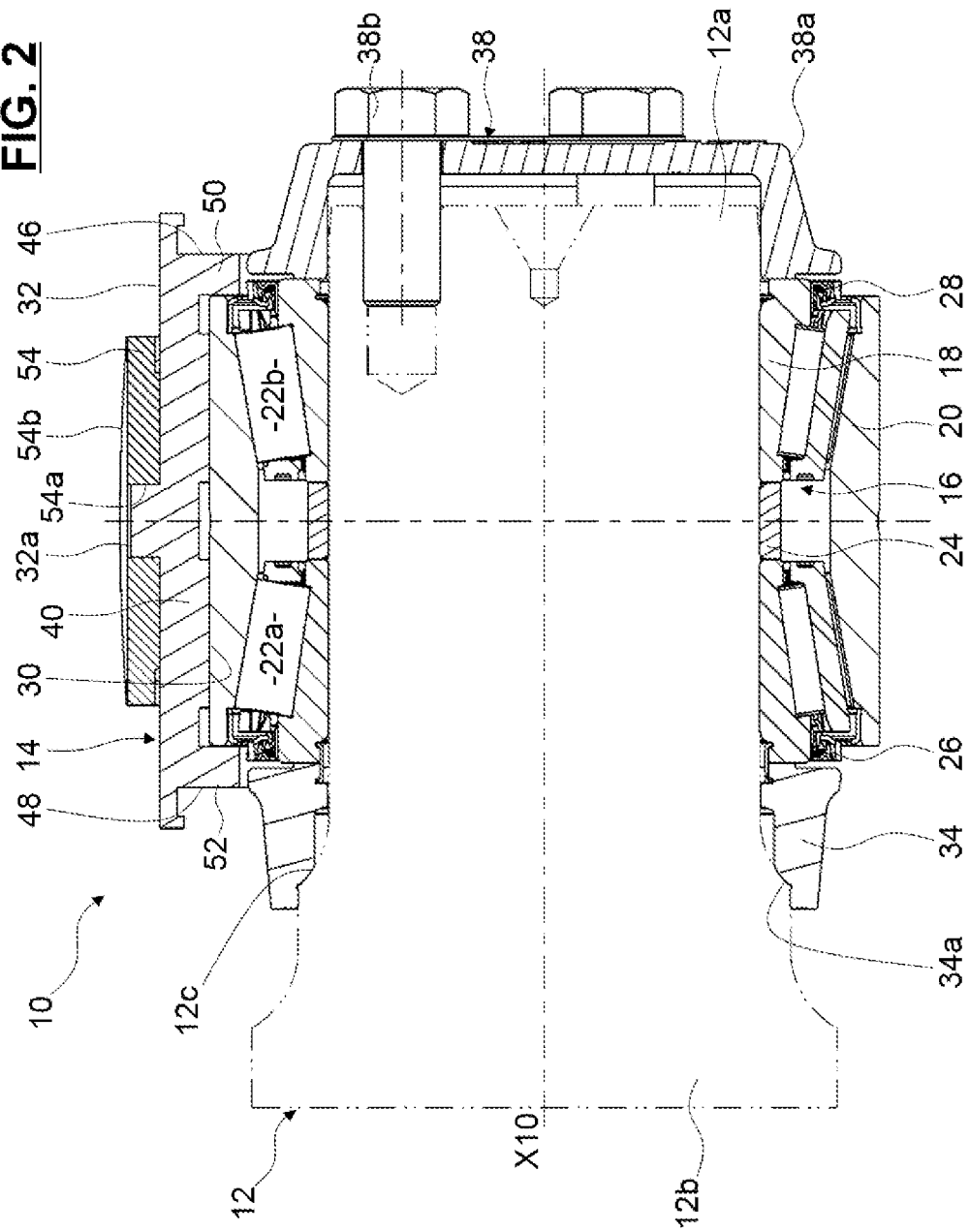
FIG. 2 is an axial cross-section of the railcar axle of FIG. 1.
Figure 3:
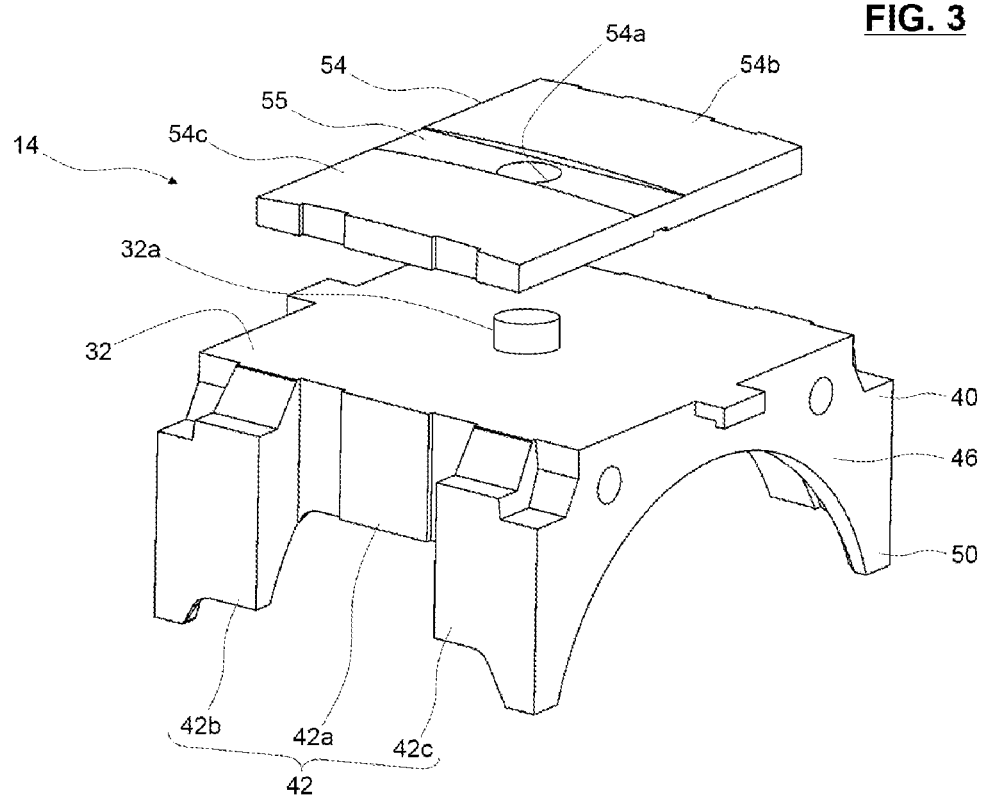
FIG. 3 is a perspective exploded view of a railcar adapter for the railcar axle of FIG. 1.

Referring to FIGS. 1 to 3, a railcar axle 10 is provided for binding the bogie frame of a railcar to the wheels (not shown). The railcar axle 10 comprises a shaft 12 (in dotted lines in FIG. 2), being rotatably mounted about an axis of rotation X10 relative to a railcar adapter 14. The railcar adapter 14 is secured to the railcar bogie frame, the shaft 12 being secured to the wheels.

A bearing 16 is radially provided between the railcar adapter 14 and the shaft 12. As illustrated in FIG. 2, the bearing 16 is of the rolling bearing type, and comprises an inner ring 18 mounted on the shaft 12, an outer ring 20 mounted inside the railcar adapter 14 and two rows of rolling elements 22a, 22b, for example rollers, arranged between raceways provided on the inner and outer rings 18, 20. The inner ring 18 is, for example, made in two parts, axially separated by an axial spacer 24. In this embodiment, the bearing 16 is a tapered rollers bearing.

The bearing 16 is further provided with sealing means 26, 28 on both axial ends. Sealing means 26, 28 close a radial space defined between the inner ring 18 and the outer ring 20. The rolling elements 22a, 22b are arranged in the sealed radial space.

The railcar adapter 14 is secured to the outer ring 20 by its radially inward side or bearing seat side 30 and is mounted inside the bogie frame.

The shaft 12 comprises a journal 12a and a dust guard having a cylindrical surface 12b whose diameter is bigger than the diameter of the journal 12a. A concave fillet 12c connects the cylindrical surface 12b on the journal 12a. The inner ring 18 of the bearing is mounted on the journal 12a.

As illustrated, the railcar axle 10 further comprises a backing ring 34 having an inner surface 34a adapted to radially come into contact with the outer surface of the shaft 12, at the fillet 12c side and to axially come into contact with the inner ring 18 of the bearing 16. Accordingly, the inner surface 34a of backing ring 34 has a rounded shape, almost complementary to that of the fillet 12c.

The railcar axle 10 also comprises an end cap assembly 38. The end cap assembly 38 includes an end cap 38a provided for being a stop element in case of a leftward translation (relative to FIG. 2) of the shaft 12 relative to the inner ring 18. Therefore, the end cap 38a is reliably secured to the journal 12 by means of three cap screws 38b and comes in axial contact with the inner ring 18 of the bearing 16.

As illustrated in detail on FIG. 1, the railcar adapter 14 comprises an adapter body 40 provided with two lateral channels 42. In the FIG. 1, only one channel 42 is illustrated, the adapter body 40 comprising another lateral channel on the opposite lateral side. Each of the lateral channels 42 is axially delimited by a pair of opposed lugs 42b, 42c and a lateral surface 42a perpendicular to the lugs. Each lateral channel 42 has a U-shape and is adapted to engage with a lug of a jaw (not shown) of the bogie frame, so as to act as an insertion guide between the adapter and the bogie frame.

The railcar body 40 also comprises a first and a second frontal flanges 50, 52 directed radially inwards. The flanges 50, 52 radially inwardly protrude with respect to the inner surface 30. The flanges 50, 52 are axially opposite one each other. The flanges 50, 52 delimit with the inner surface 30 a housing for the outer ring 20 of bearing 16. The outer ring 20 is axially arranged between the flanges 50, 52.

The body 40 of the railcar adapter 14 further comprises two frontal surfaces 46, 48, the inner surface 30 acting as a bearing seat in radial contact with the outer ring 20 of the bearing 16, and an outer surface 32. The outer surface 32 is flat.

The inner surface 30 has a concave shape of constant radius so as to sit on the outer cylindrical surface of the outer ring 20 of the bearing 16.

The adapter body 40 is made from metal by any suitable process, such as, for example, by casting. For example, the body 40 is made from steel or cast iron.

The railcar adapter 14 is further provided with a top cover 54 mounted onto the outer surface 32 of adapter body 40.

The top cover 54 may be securely fixed to the fixing plate, for example by screws (not illustrated).

The top cover 54 is provided with one recess 54a receiving a radially outwardly projecting pin 32a provided to outer surface 32. The pin 32a permits to centre the top cover 54 with respect to the adapter body 40.

The outer side of top cover 54 is provided with an upper central groove 55 extending along an axis parallel to the axis of rotation X10 of the bearing 16. The recess 54a is advantageously provided within the upper groove 55.

The top cover has two outer surfaces 54b, 54c acting as a frame seat in direct radial contact with the bogie frame. The outer surfaces 54b, 54c are on both sides of upper central groove 55. The railcar adapter 14 is then mounted inside the bogie frame by the radially outward side or frame seat side 54b, 54c of top cover 54. The upper central groove 55 is optional, and the top cover 54 may comprise only one outer surface in direct contact with the bogie frame.

According to the invention, the outer surfaces 54b, 54c are curved, in cross-section through the axis of rotation X10 of the bearing 16. In the illustrated embodiment, the outer surfaces 54b, 54c are cylindrical. Alternatively, the outer surfaces 54b, 54c may be spherical.

The bogie frame comprises a lower surface in radial abutment against the outer surfaces 54b, 54c of railcar adapter 14. In case of relative misalignment between the bogie frame and the bearing 16, the bogie frame can swivel onto the curved outer surfaces 54b, 54c. The misalignment is then compensated. The railcar adapter 14 is prevented from any displacement with respect to the bearing 16.

The top cover 54 is made from metal by any suitable process, such as, for example, by casting. For example, the top cover 54 is made from steel or cast iron. Alternatively, the top cover is made from a plastic or polymeric material.

It should be noted that the embodiments, illustrated and described were given merely by way of non-limiting indicative examples and that modifications, combinations and variations are possible within the scope of the invention.

The invention has been illustrated on the basis of a rolling bearing provided with at least one row of rolling elements radially disposed between the inner and outer rings. Alternatively, the bearing may be a plain bearing or a sliding bearing comprising one or two rings.

What is claimed is:

1. A railcar adapter for radially connecting a railcar body to a bearing, and comprising an adapter body having:
   a first lateral channel and a second lateral channel each delimited by a pair of opposed lugs and a lateral surface perpendicular to the opposed lugs, the lateral channels being adapted to cooperate with the railcar body,
   a first frontal surface and a second frontal surface,
   an inner surface acting as a bearing seat for the bearing, and
   an outer surface, wherein the first and second frontal surface of the railcar adapter each define two frontal flanges that inwardly protrude with respect to the inner surface, and that delimit with the inner surface a housing for the bearing, wherein the railcar adapter is further provided with a top cover mounted onto the outer surface of adapter body, the top cover having at least one outer surface adapted to be in direct radial contact with the railcar body, the top cover having first and second lateral ends each of which is flush with an associated lateral edge of the adapter body as defined by the pair of opposed lugs and the lateral surface, and wherein the outer surface of top cover, in cross-section through the axis of rotation of bearing, is curved.

2. The railcar adapter according to the claim 1, wherein the top cover is securely fixed to the outer surface of adapter body by fixing means.

3. The railcar adapter according to the claim 1, wherein the top cover comprises at least one recess receiving a corresponding pin provided to the outer surface of adapter body.

4. The railcar adapter according to the claim 1, wherein the outer surface of top cover is spherical.

5. The railcar adapter according to the claim 1, wherein the outer surface of top cover is cylindrical.

6. The railcar adapter according to the claim 1, wherein the outer surface of adapter body is flat.

7. A railcar adapter assembly comprising:
a railcar adapter,
a bearing mounted inside the railcar adapter,
a backing ring adapted to come into axial contact with the bearing at a first side, and
an end cap assembly adapted to come into axial contact with the bearing at another side, opposite to the first side, the railcar adapter comprising an adapter body having:
two lateral channels each delimited by a pair of opposed lugs and a lateral surface perpendicular to the opposed lugs, the lateral channels being adapted to cooperate with the railcar body,
two frontal surfaces,
an inner surface acting as a bearing seat for the bearing, and
an outer surface,
wherein each of the two frontal surfaces of the railcar adapter define two frontal flanges that inwardly protrude with respect to the inner surface, and that delimit with the inner surface a housing for the bearing, wherein the railcar adapter is further provided with a top cover mounted onto the outer surface of adapter body, the top cover having an outer side with an upper central groove extending along an axis parallel to the axis of rotation of the bearing, the top cover having two outer surfaces on both sides of the upper central groove and adapted to be in direct radial contact with the railcar body, the top cover having first and second lateral ends each of which is flush with an associated lateral edge of the adapter body as defined by the pair of opposed lugs and the lateral surface, and wherein the outer surface of top cover, in cross-section through the axis of rotation of bearing, is curved.

8. The railcar adapter assembly according to the claim 7, wherein the bearing comprises at least one inner ring and at least one outer ring mounted in radial contact with the inner surface of the railcar adapter, wherein each of the lateral surfaces defines a protuberance thereon, the first and second lateral ends of the top cover also being flush with the protuberance.

9. The railcar adapter assembly according to the claim 7, wherein the bearing comprises at least one row of rolling elements, arranged between raceways provided on the inner and outer rings.

10. The railcar adapter assembly according to the claim 7, wherein the inner ring of the bearing is made in two parts, axially separated by an axial spacer.

11. The railcar adapter assembly according to the claim 7, wherein the top cover is securely fixed to the outer surface of adapter body by fixing means.

12. The railcar adapter assembly according to the claim 7, wherein the top cover comprises at least one recess receiving a corresponding pin provided to the outer surface of adapter body.

13. The railcar adapter assembly according to the claim 7, wherein the outer surface of top cover is spherical.

14. The railcar adapter assembly according to the claim 7, wherein the outer surface of top cover is cylindrical.

15. The railcar adapter assembly according to the claim 7, wherein the outer surface of adapter body is flat.

16. The railcar adapter assembly according to the claim 7, wherein the top cover has an outer side with an upper central groove extending along an axis parallel to the axis of rotation of the bearing, the top cover having two curved outer surfaces on both sides of the upper central groove and adapted to be in direct radial contact with the railcar body.

* * * * *